US006621578B1

(12) United States Patent
Mizoguchi (10) Patent No.: US 6,621,578 B1
(45) Date of Patent: Sep. 16, 2003

(54) ELLIPOSOMETER, SAMPLE POSITIONING MECHANISM, AND POLARIZATION ANGULAR ADJUSTING MECHANISM, USED IN THE ELLIPOSOMETER (75) Inventor: Iwao Mizoguchi, Wako (JP)

(73) Assignee: Olympus Optical Co, Ltd., Tokyo (JP)

( * ) Notice: Subject to any disclaimer, the term of this patent is extended or adjusted under 35 U.S.C. 154(b) by 174 days.

(21) Appl. No.: 09/707,008

(22) Filed: Nov. 6, 2000

(30) Foreign Application Priority Data

Nov. 26, 1999 (JP) .......................................... 11-336287
Nov. 26, 1999 (JP) .......................................... 11-336288

(51) Int. Cl.[7] ................................................. G01J 4/00
(52) U.S. Cl. ........................ 356/369; 356/623; 356/631
(58) Field of Search ................................ 356/364, 365, 356/366, 367, 368, 369, 614, 622, 623, 630, 631, 632; 250/225

(56) References Cited

U.S. PATENT DOCUMENTS

| | | | |
|---|---|---|---|
| 3,880,524 A | | 4/1975 | Dill et al. |
| 5,748,318 A | * | 5/1998 | Maris et al. ............... 356/381 |
| 6,091,499 A | | 7/2000 | Abraham et al. |

FOREIGN PATENT DOCUMENTS

| | | |
|---|---|---|
| EP | 0 950 881 A | 10/1999 |
| FR | 2 501 861 A | 9/1982 |
| WO | 0 982 580 A1 | 3/2000 |

OTHER PUBLICATIONS

Patent Abstracts of Japan, vol. 1997, No. 12, Dec. 25, 1997.

* cited by examiner

Primary Examiner—Hoa Q. Pham
(74) Attorney, Agent, or Firm—Frishauf, Holtz, Goodman & Chick, P.C.

(57) ABSTRACT

An ellipsometer, which detects polarization of light successively reflected from a reference sample and an objective sample to study the objective sample, comprises first and second sample holder units for holding first and second samples, a beam projecting portion for projecting a beam of plane-polarized light toward the first sample, a polarizer, a turn-around prism for turning around the light beam reflected from the first sample to direct it to the second sample, an analyzer, a light detector for detecting light transmitted through the analyzer, and a sample positioning mechanism for arranging the first and second samples at appropriate positions and in appropriate orientations. The sample positioning mechanism includes one of the first and second sample holder units, which holds the objective sample, and comprises a height/inclination adjusting section for adjusting height and inclination of the objective sample.

24 Claims, 3 Drawing Sheets

ELLIPOSOMETER, SAMPLE POSITIONING MECHANISM, AND POLARIZATION ANGULAR ADJUSTING MECHANISM, USED IN THE ELLIPOSOMETER

CROSS-REFERENCE TO RELATED APPLICATIONS

This application is based upon and claims the benefit of priority form the prior Japanese Patent Applications No. 11-336287, filed Nov. 26, 1999; and No. 11-336288, filed Nov. 26, 1999, the entire contents of which are incorporated herein by reference.

BACKGROUND OF THE INVENTION

The present invention relates to an ellipsometer for studying optical characteristics or film thickness of a sample by detecting a change in polarization of light, which has been plane-polarized before reflected by a surface of the sample.

The ellipsometer is an instrument or apparatus that studies optical characteristics or film thickness of a sample by basically causing plane-polarized light to be reflected at a surface of the sample and then measuring resultant elliptically-polarized light produced by the reflection.

There is a type of the ellipsometer, which causes plane-polarized light to be successively reflected by an objective sample to be measured and a reference sample as a criterion for comparison. Such ellipsometer is designed such that influences to the polarization by the respective reflections at the objective and reference sample surfaces are cancelled out when the optical characteristics of the surface of the objective sample are coincident with those of the reference sample. Since the ellipsometer detects difference in optical characteristics between the reference and objective sample surfaces, it has a relatively high sensitivity.

In the ellipsometer using the reference sample and the objective sample, both samples should be accurately positioned. In other words, both of the reference sample and the objective sample should be placed at appropriate positions and in appropriate orientations.

The most general manner for producing plane-polarized light having a specific plane of polarization is to cause nonpolarized light to pass through a polarizer, which allows light having a specific plane of polarization to transmit therethrough. In practice, the ellipsometer generally employ the plane-polarized light produced in this manner.

However, such ellipsometer has extremely low utilization ratio of light. More specifically, the ratio of light components transmitting through the polarizer to those incident upon the polarizer is very low. The low utilization ratio of light is a main reason why the ellipsometer enabling highly accurate measurement has not been attained.

BRIEF SUMMARY OF THE INVENTION

An object of the present invention is to provide an ellipsometer capable of placing a reference sample and an objective sample to be measured at appropriate positions and in appropriate orientations, and also provide a sample positioning mechanism for use in appropriate positioning.

Another object of the present invention is to provide an ellipsometer efficiently utilizing light, and also provide a polarization angular adjusting mechanism for use in the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
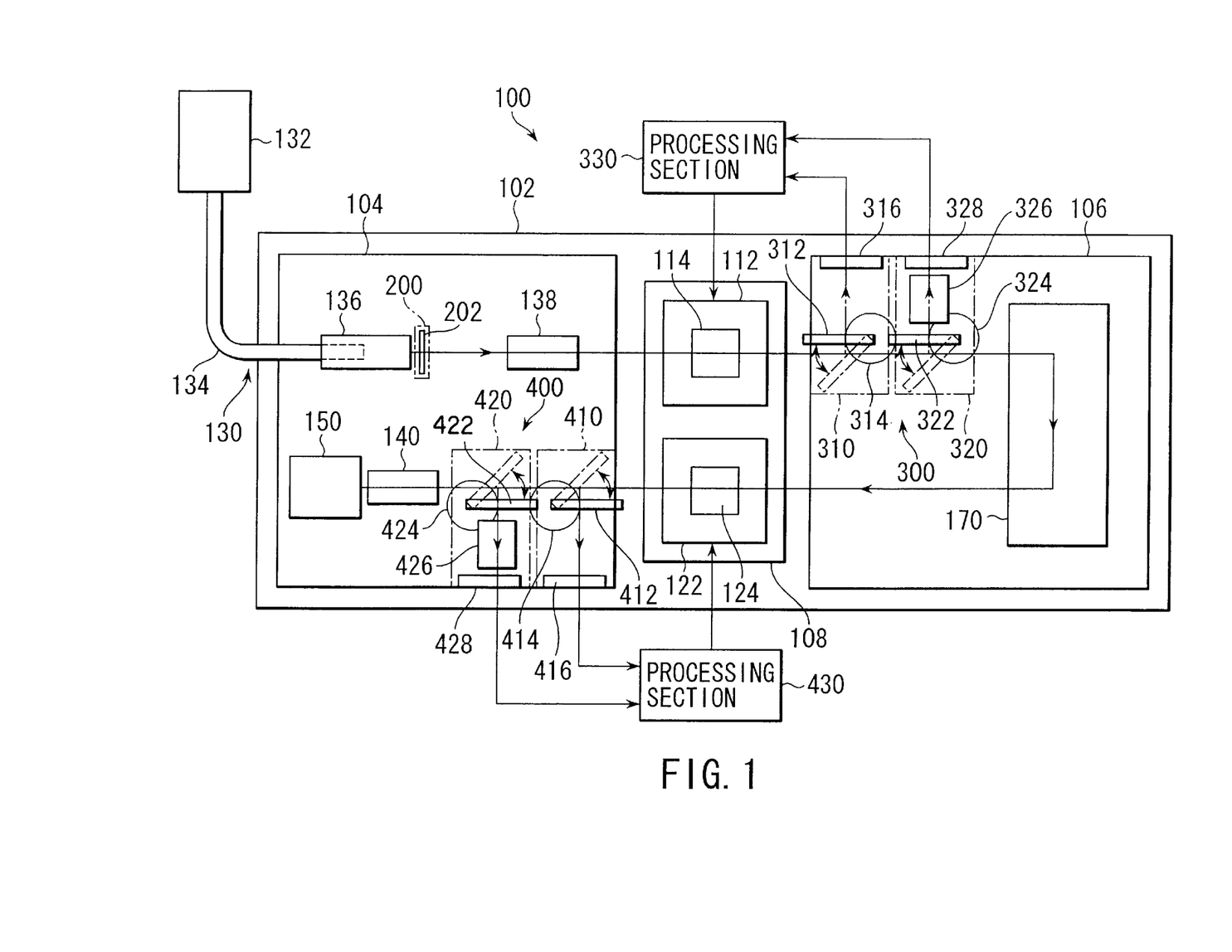
FIG. 1 is a plan view of an ellipsometer according to an embodiment of the present invention.

As shown in FIG. 1, according to an embodiment of the present invention, an ellipsometer 100 comprises a pair of sample holder units 112, 122 for holding two kinds of samples. For example, the sample holder unit 112 holds a reference sample 114, whereas the sample holder unit 122 holds an objective sample 124. The reference sample 114 is used as a criterion for comparison with the objective sample 124 in analyzing polarization.

Alternatively, the sample holder unit 112 may hold the objective sample in place of the reference sample, whereas the sample holder unit 122 may hold the reference sample in place of the objective sample. Such replacement produces no difference in optical characteristics and the measurement results. However, herein, the following explanation will be made on the assumption that the sample holder unit 112 holds the reference sample and the sample holder unit 122 holds the objective sample.

The reference sample holder unit 112 and the objective sample holder unit 122 are placed on an XY stage 108 on the base 102 so as to be displaced by the XY stage 108 in parallel to the upper surface of the base 102.

The ellipsometer 100 comprises a beam projecting portion 130 for projecting a light beam toward the reference sample 114, a polarizer 138 for allowing light having a specific plane of polarization to transmit therethrough, a turn-around prism 170 for turning around the light beam reflected from the reference sample 114 in parallel at a distance to direct it to the objective sample 124, an analyzer 140 for allowing light having a specific plane of polarization to transmit therethrough, and a light detector 150 for detecting light transmitted through the analyzer 140.

Furthermore, the ellipsometer 100 has a first optical path or forward optical path, which extends from the beam projecting portion 130 to the turn-around prism 170 through the reference sample 114, and a second optical path or backward optical path, which extends from the turn-around prism 170 to the light detector 150 through the objective sample 124. The first and second optical paths extend in parallel at a distance between them and coupled with each other through the turn-around prism 170.

The beam projecting portion 130 comprises a light source 132, an optical fiber 134, and an optical fiber fixing portion 136. The light source 132 may comprises a solid laser, gas laser, semiconductor laser, or dye laser. In use of the semiconductor laser as the light source, the beam projecting portion 130 should include a collimator.

The polarizer 138 is located on the forward optical path between the optical fiber fixing portion 136 and the reference sample 114. The analyzer 140 is located on the backward optical path between the objective sample 124 and the light detector 150.

Each of the polarizer 138 and the analyzer 140 preferably comprises a Gran-Thompson prism. The polarizer 138 and the analyzer 140 are arranged so that planes of polarization of light transmitted therethrough mutually intersect at right angles. In other words, the polarizer 138 and the analyzer 140 are arranged so as to satisfy crossed Nicols.

The polarizer 138 is angularly positioned so as to transmit light having a plane of polarization inclined by an angle of +45° with respect to a plane of incidence of the reference sample 114. The term "plane of incidence of the reference sample 114" used herein means a plane containing a normal to the wavefront incident on a surface of the reference sample 114, that is, a direction of propagation, and a normal to the sample surface.

The light detector 150 comprises a photodiode, APD, or photomultiplier, for example. In use of a multiwave light source, such as a xenon lamp or a halogen lamp is used, the light detector 150 should include a spectroscope.

The optical fiber fixing portion 136, the polarizer 138, analyzer 140, and light detector 150, all are mounted on a first support board 104. The first support board 104 is inclined at a predetermined angle with respect to the base 102. An incident angle of the plane-polarized light beam transmitted through the polarizer 138 with respect to the reference sample 114 is determined by the aforementioned predetermined angle.

The turn-around prism 170 is mounted on a second support board 106. The second support board 106 is inclined with respect to the base 102 by the same angle of the first support board 104 with respect to the base 102.

Figure 2:
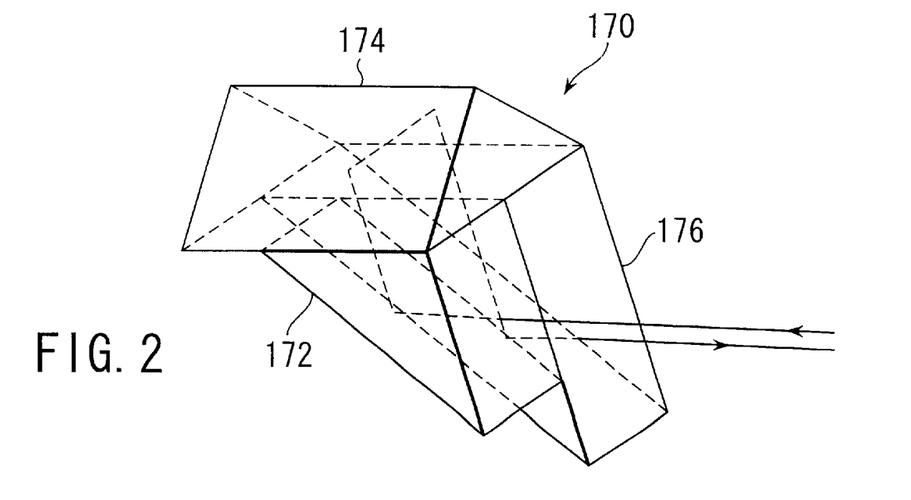
FIG. 2 is a perspective view of a turn-around prism shown in FIG. 1.

The turn-around prism 170 comprises three right-angle prisms 172, 174 and 176 cemented with each other, as shown in FIG. 2. The turn-around prism 170 reflects the beam four times within it so as to cause the turned-around beam to exit in parallel to the incident beam at a predetermined distance. The turn-around prism 170 is fixed on the second support board 106 inclined by an angle of 45° such that a plane containing axes of the incident and turned-around beams is in parallel to the surface of the second support board 106.

In FIG. 1, a light beam emitted from the light source 132 propagates within the optical fiber 134 and is projected from the optical fiber fixing portion 136. The light beam projected from the optical fiber fixing portion 136 passes through the polarizer 138 to be of plane-polarized light having a plane of polarization inclined by an angle of +45° with respect to the plane of incidence of the reference sample 114 and then reflected at a surface of the reference sample 114 mounted on the sample holder unit 112. The plane-polarized light is changed into elliptically polarized light by the reflection, the elliptically polarized light depending on optical characteristics, film thickness, or the like of the reference sample.

The elliptically polarized light beam is turned around by the turn-around prism 170 in parallel at a predetermined distance, reflected four times within it. The resultant elliptically polarized light has elliptical polarization whose major axis component and minor axis component are same in magnitude and direction (for example, major axis) but opposite in rotation direction to the elliptically polarized light before turned around.

The turned-around light beam from the turn-around prism 170 is reflected by the objective sample 124 mounted on the sample holder unit 122 to be directed to the analyzer 140. Since the analyzer 140 allows only the minor axis component of the elliptical polarization to transmit therethrough, the beam of only of the elliptical polarization is transmitted through the analyzer 140 and reaches the light detector 150.

If the light beam incident upon the light detector 150 has a multi-wavelength, it is spectroscopically treated and thereby photoelectrically transferred per wavelength. The electric signal output from the light detector 150 is supplied into a computer at which a predetermined arithmetic operation is performed. As a result, measurement data representing optical characteristics, film thickness, or the like are obtained.

When the reference sample 114 is the same as the objective sample 124, the effects of both samples upon the light beam are mutually cancelled out. A quenching phenomenon is resulted in which no light is detected by the light detector 150.

Sample Positioning Mechanism

For accurate detection of light with the light detector 150 in the ellipsometer 100, the reference sample 114 and the objective sample 124 must be located at appropriate positions and in appropriate orientations. As to the orientation, the height is particularly important. In other words, the reference sample 114 and the objective sample 124 must be located at appropriate heights and with appropriate inclinations. Therefore, the sample holder unit 112 can adjust the height and inclination of the reference sample 114 and the sample holder unit 122 can adjust the height and inclination of the objective sample 124.

The term "inclination", as used herein, refers a degree of anti-parallelism of the surface of the sample with respect to the upper surface of the base 102. The inclination can be decomposed into an inclination about a first axis, which is parallel to the upper surface and parallel to a projection of the forward optical path or the backward optical path onto the upper surface of the base 102, and an inclination about a second axis, which is parallel to the upper surface and perpendicular to the projection of the forward optical path or the backward optical path onto the upper surface of the base 102. The "height", as used herein, refers the position along a third axis perpendicular to the upper surface of the base 102. Hereinafter, the first, second, and third axes are referred to as an X-, Y-, and Z-axes, respectively.

Figure 3:
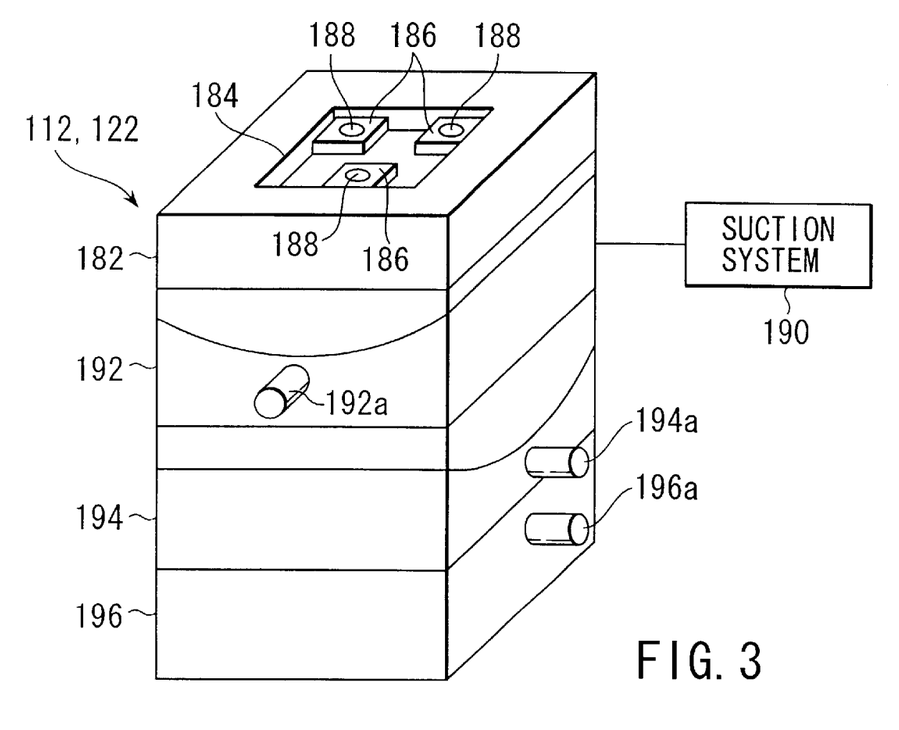
FIG. 3 is a perspective view of a sample holder unit shown in FIG. 1.

The reference sample holder unit 112 and objective sample holder unit 122 have the same structure. Each unit comprises a sample holder 182, a goniostage 192 for inclining the sample holder 182 about the X-axis, a goniostage 194 for inclining the sample holder 182 together with the goniostage 192 about the Y-axis, and a height adjusting stage 196 for displacing the sample holder 182 together with the two goniostages 192 and 194 along the Z-axis, as shown in FIG. 3.

The sample holder 182 has a recess 184 for containing a sample and three support portions 186, formed in the recess, for supporting the sample. Each of the support portions 186 has a suction port 188, which is communicated with a suction system 190. When the suction port 72 is sucked by means of the suction system 190, the samples is vacuum-fixed on three support portions 186 due to negative pressure.

The goniostage 192 has a rotatable input axis 192*a* for adjusting the inclination such that the sample holder 182 is inclined about the X-axis on rotating the input axis 192*a*. The goniostage 194 has a rotatable input axis 194*a* for adjusting the inclination such that the sample holder 182 is inclined about the Y axis on rotating the input axis 194*a*. The height adjusting stage 196 has a rotatable input axis 196*a* for adjusting the height such that the holder 182 is displaced along the Z-axis on rotating the input axis 196*a*.

The two sample holder units 112 and 122 and the height adjusting stage 196 may be integrated into one body. In other words, both the sample holder 182, the goniostages 192, 194 of the reference sample holder unit 112 and those of the objective sample holder unit 122 may be arranged on a single height adjusting stage 196.

The ellipsometer 100 has a sample positioning mechanism for adjusting the heights and inclinations of the reference sample 114 and the objective sample 124. The sample positioning mechanism includes the two sample holder units 112 and 122. In addition to these, the sample positioning mechanism has a height/inclination adjusting section 300 for the reference sample and a height/inclination adjusting section 400 for the objective sample.

The height/inclination adjusting section 300 has a height-measuring CCD unit 310, an inclination-measuring CCD unit 320, and a processing portion 330 for processing data obtained by the CCD units 310 and 320.

The height measuring CCD unit 310 has a mirror 312 for deflecting the light beam as needed, a rotary 314 for moving the mirror 312 between a position crossing the optical path and a position off the optical path, and a CCD camera 316 for taking a picture of the light beam deflected by the mirror 312.

The height measuring CCD unit 320 has a mirror 322 for deflecting the light beam as needed, and a rotary 324 for moving the mirror 322 between a position crossing an optical path and a position off the optical path, an objective lens 326 for converging the light beam deflected by the mirror 322, and a CCD camera 328 for taking a picture of the light beam converged by the objective lens 326.

In FIG. 1, the height measuring CCD unit 310 is positioned upstream of the direction of propagation of the beam, whereas the inclination measuring CCD unit 320 is positioned downstream thereof. These CCD units may be arranged oppositely. In other words, it may be possible that the height measuring CCD unit 320 is positioned upstream, whereas the height measuring CCD unit 310 is positioned downstream.

Similarly, the height/inclination adjusting section 400 of the objective sample includes a height measuring CCD unit 410, an inclination measuring CCD unit 420, and a processing portion 430 for processing data obtained by these CCD units 410 and 420.

The height measuring CCD unit 410 has a mirror 412 for deflecting the light beam as needed, and a rotary 414 for moving the mirror 412 between a position crossing an optical path and a position off the optical path, and a CCD camera 416 for taking a picture of the light beam deflected by the mirror 412.

The inclination measuring CCD unit 420 has a mirror 422 for deflecting the light beam as needed, and a rotary 424 for moving the mirror 422 between a position crossing an optical path and a position off the optical path, an objective lens 426 for converging the light beam deflected by the mirror 422, and a CCD camera 428 for taking a picture of the light beam converged by the objective lens 426.

In FIG. 1, the height measuring CCD unit 410 is positioned upstream of the direction of propagation of the beam, whereas the inclination measuring CCD unit 420 is positioned downstream thereof. These CCD units may be arranged oppositely. In other words, it may be possible that the inclination measuring CCD unit 420 is positioned upstream, wherein the height measuring CCD unit 410 is placed downstream.

The height and inclination of the reference sample 114 may be manually or automatically performed.

In order to manually adjust the height and inclination of the reference sample 114, the processing portion 330 has a monitor for displaying an image of a spot of the light beam in the picture obtained by the CCD camera 316 of the height measuring CCD unit 310 and an image of a spot of the converged light beam in the picture obtained by the CCD camera 328 of the inclination measuring CCD unit 320.

The height and inclination are adjusted as follows. First, the mirror 312 of the height measuring CCD unit 310 is placed at the position across the optical path so that the image of the spot of the light beam in the picture obtained by the CCD camera 316 is displayed on the monitor. While viewing the display, an operator manually operates the input axis 196*a* of the height adjusting stage 196 to adjust the height adjusting stage 196 so as to position a center of the gravity of the spot image at an appropriate position, for example, at the center. After the adjusting, the mirror 312 is returned to the position off the optical path.

Subsequently, the mirror 322 of the inclination measuring CCD unit 320 is placed at the position across the optical path so that the image of the spot of the converged light beam in the picture obtained by the CCD camera 328 is displayed on the monitor. While viewing the display, the operator manually operates the input axes 192*a*, 194*a* of the goniostages 192, 194 to adjust the goniostages 192, 194 so as to place the image of the converged spot at an appropriate position, for example, the center position. After the adjusting, the mirror 312 is returned to a position off the optical path.

On the other hand, in order to automatically adjust the height and inclination of the reference sample 114, the processing portion 330 includes an arithmetic calculation means for obtaining data of height and inclination of the reference sample 114, a driving means for driving the input axis 192*a* of the goniostage 192, the input axis 194*a* of the goniostage 194, and the input axis 196*a* of the height adjusting stage 196, and a control means for controlling the driving means in accordance with the data of height and inclination.

The arithmetic calculation means converts an image of a spot of the light beam in the picture obtained by the CCD camera 316 of the height measuring CCD unit 310 into binary form to obtain a center of gravity of the spot, and also obtains inclination data on the basis of a position of an image of a spot of the converged light beam in the picture obtained by the CCD camera 328 of the inclination measuring CCD unit 320.

The driving means includes, for example, three stepping motors, which have rotation shafts connected directly or indirectly through members such as rubber or belts to the input axis 192*a* of the goniostage 192, the input axis 194*a* of the goniostage 194, and the input axis 196*a* of the height adjusting stage 196, respectively.

The height and inclination of the reference sample 114 are adjusted as follows. First, the mirror 312 of the height measuring CCD unit 310 is placed at the position crossing the optical path. The arithmetic calculation means obtains the height data based on the position of the center of gravity of the image of the spot in the picture obtained by the CCD camera 316. The control means controls the driving means with the height data at an appropriate value such that the height adjusting stage 196 is correctly adjusted. After the adjustment, the mirror 312 is returned to the position off the optical path.

Then, the mirror 322 of the inclination measuring CCD unit 320 is placed at the position crossing the optical path. The arithmetic calculation means obtains the inclination data based on the position of the image of the spot of the converged light beam in the picture obtained by the CCD camera 328. The control means controls the driving means with the inclination data at appropriate values such that the goniostages 192, 194 are correctly adjusted. After the adjustment, the mirror 322 is returned to a position off the optical path.

In the present embodiment, the height is adjusted first and then, the inclination is adjusted. However, the height and inclination may be adjusted in a reverse order. More specifically, it may be possible that the inclination is adjusted first and then the height is adjusted.

In the same manner as in the reference sample 114, the height and inclination of the objective sample 124 may be manually or automatically adjusted.

In order to manually adjust the height and inclination of the objective sample 124, the processing portion 430 has a monitor for displaying an image of a spot of the light beam in the picture obtained by the CCD camera 416 of the height measuring CCD unit 410 and an image of a spot of the converged light beam in the picture obtained by the CCD camera 428 of the inclination measuring CCD unit 420.

The height and inclination are adjusted as follows. First, the mirror 412 of the height measuring CCD unit 410 is placed at the position crossing the optical path so that the image of the spot of the light beam in the picture obtained by the CCD camera 416 is displayed on the monitor. While viewing the monitor, an operator manually operates the input axis 196a of the height adjusting stage 196 to adjust the height adjusting stage 196 so as to place a center of the gravity of the spot image at an appropriate position, for example, at the center. After the adjustment, the mirror 412 is returned to the position off the optical path.

Subsequently, the mirror 422 of the inclination measuring CCD unit 420 is placed to the position crossing the optical path so that the image of the spot of the converged light beam in the picture obtained by the CCD camera 428 is displayed on a monitor. While viewing the monitor, the operator manually operates the input axes 192a, 194a of the goniostages 192, 194 to adjust the goniostages 192, 194 so as to place the image of the converged spot at an appropriate position, for example, at the center. After the adjustment, the mirror 422 is returned to the position off the optical path.

On the other hand, in order to automatically adjust the height and inclination of the objective sample 124, the processing portion 430 includes an arithmetic calculation means for obtaining data of height and inclination of the objective sample 124, a driving means for rotating the input axis 192a of the goniostage 192, the input axis 194a of the goniostage 194, and the input axis 196a of the height adjusting stage 196, and a control means for controlling the driving means in accordance with the data of height and inclination.

The arithmetic calculation means converts an image of a spot of the light beam in the picture obtained by the CCD camera 416 of the height measuring CCD unit 410 into binary form to obtain a center of gravity of the spot, and also obtains inclination data on the basis of a position of an image of a spot of the converged light beam in the picture obtained by the CCD camera 428 of the inclination measuring CCD unit 420. The driving means includes, for example, three stepping motors, which have rotation shafts connected directly or indirectly through members such as rubber or belts to the corresponding input axes.

The height and inclination of the objective sample 124 are adjusted as follow. The mirror 412 of the height measuring CCD unit 410 is placed at the position crossing the optical path. The arithmetic calculation means obtains the height data based on the position of the center of gravity of the image of the spot in the picture obtained by the CCD camera 416. The control means controls the driving means with the height data at an appropriate value such that the height adjusting stage 196 is correctly adjusted. After the adjustment, the mirror 412 is returned to the position off the optical path.

Then, the mirror 422 of the inclination measuring CCD unit 420 is placed at the position crossing the optical path. The arithmetic calculation means obtains the inclination data based on the position of the image of the spot of the converged light beam in the picture obtained by the CCD camera 428. The control means controls the driving means with the inclination data at appropriate values such that the goniostages 192, 194 are correctly adjusted. After the adjustment, the mirror 422 is returned to the position off the optical path.

In the present embodiment, the height is adjusted first and then, the inclination is adjusted. However, the height and the inclination may be adjusted in a reverse order. More specifically, it may be possible that the inclination is adjusted first and then the height is adjusted.

The ellipsometer 100 of the present embodiment has the sample positioning mechanism for adjusting the height and inclination of the reference sample 114 and the objective sample 124. The highly reproducible and accurate measurement can be performed.

Polarization Angular Adjusting Mechanism

In the ellipsometer 100, the light incident upon the polarizer 138 is preferably a plane-polarized light having the same plane of polarization as that of the plane-polarized light that the polarizer 138 allows to transmit. Therefore, as for the beam projecting portion 130, the light source 132 preferably emits a plane-polarized light and the optical fiber 134 comprises a polarization-preserving fiber, which is fixed to the optical fiber fixing portion 136 so that the plane of polarization of the plane-polarized light projected from the polarization-preserving fiber is the same as that of the plane-polarized light that the polarizer 138 allows to transmit.

The optical fiber 134, not limited to the polarization-preserving fiber, is required to be fixed to the optical fiber fixing portion 136 at a right position on a plane perpendicular to the optical axis and with a right orientation so that the light is appropriately detected by the light detector 150.

These requirements are stringent in assembling the apparatus. In addition to them, it is very difficult to appropriately adjust the angular orientation or angle about the optical axis of polarization-preserving fiber 134 as mentioned above.

The ellipsometer 100 has a polarization angular adjusting mechanism 200 for adjusting the angle of the plane of polarization of the beam projected from the beam projecting portion 130 about the optical axis, in order to satisfy the requirements for using light efficiently, in other words, to cause the plane-polarized light having the same plane of polarization as the light that the polarizer 138 allows to transmit to enter the polarizer 138, without requiring stringent requirements in assembling the apparatus.

The polarization angular adjusting mechanism 200, which is arranged between the beam projecting portion 130 and the polarizer 138, comprises a plane-polarized light rotating element 202 rotatably supported about the optical axis. As the plane polarization rotation element 202 used herein, any optical element may be used as long as it is rotates a plane of polarization of incident plane polarized light.

The plane polarization rotational element 202, which comprises a half-wave plate, for example, converts the incident plane-polarized light having the plane of polarization with an angle of θ with respect to the optic axis into the plane-polarized light having the plane of polarization with an angle of 2 θ with respect to the optic axis. When the half-wave plate is rotated so that the direction of the optic axis of the half-wave plate is changed within a range of 0 to 180° with respect to the plane of polarization of the incident plane-polarized light, the plane of polarization of the light transmitted through the plate is varied within a range of 0 to 360°. That is, the angular orientation or angle of the plane of polarization of the light transmitted through the halfwave plate can be changed by rotating the half-wave plate.

Figure 4:
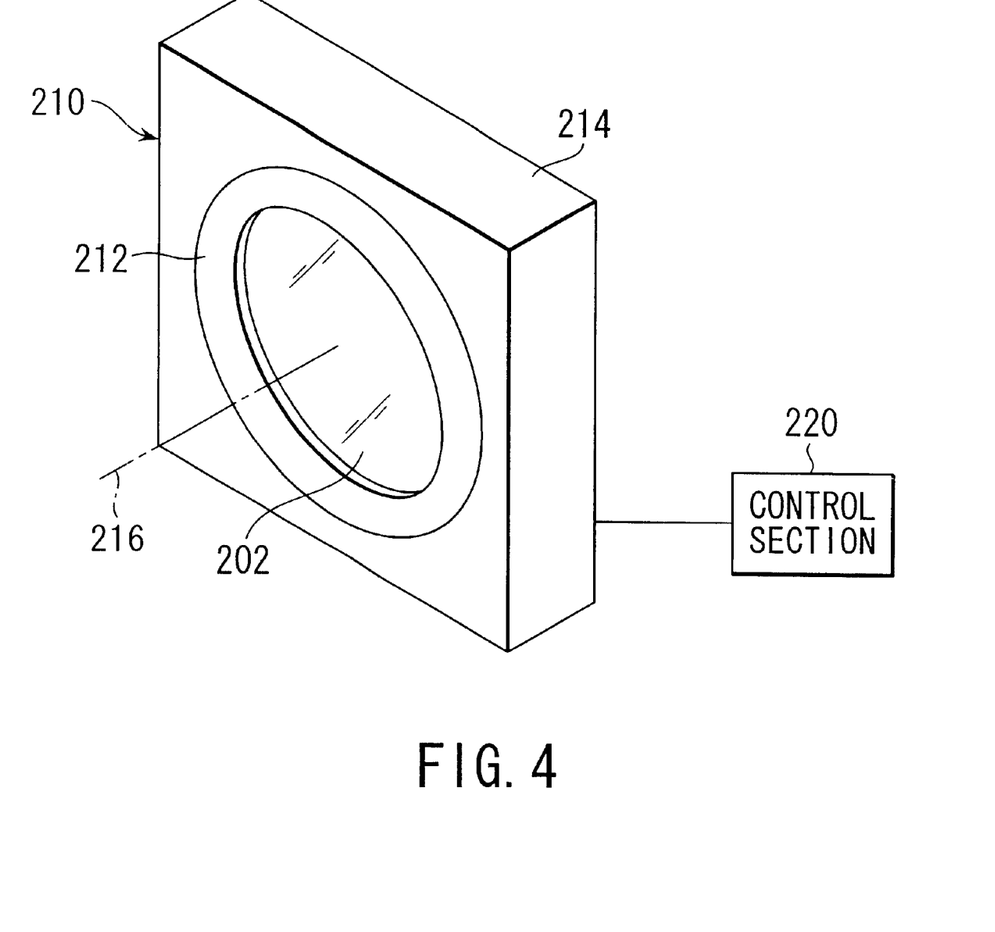
FIG. 4 is a perspective view of the polarization angular adjusting mechanism shown in FIG. 1.

The polarization angular adjusting mechanism 200 has a mount 210 for rotatably supporting the plane polarization rotatory element 202, as shown in FIG. 4. The mount 210 has a movable frame for holding the plane polarization rotatory element 202 and a fixed frame 214 for supporting the movable frame 212 rotatably about the axis 216, which is coincident with the optical axis. The fixed frame 214 may have an angular adjusting mechanism for adjusting an angle of the movable frame 212 about the axis 216, such that the angular adjusting mechanism, which has a rotatable input axis, converts the rotation of the input axis into a relatively minute angular change of the movable frame.

The angular orientation or angle of the plane polarization rotatory element 202 about the optical axis is, for example, manually adjusted as follows. While monitoring the output from detection means for detecting the light transmitted through the polarizer 138, an operator rotates the input axis of the angular adjusting mechanism of the fixed frame 214 by hand to set the angle of the movable frame 212 so as to obtain a maximum output from the detection means. After the adjustment, the movable frame 212 is fixed on the fixed frame 214 by means of, for example, a screw.

Alternatively, the angular orientation or angle of the plane polarization rotatory element 202 about the optical axis may be automatically adjusted. The polarization angular adjusting mechanism 200 further comprises a control section 220 for controlling the polarization angular adjusting mechanism. The control section 220 comprises, for example, driving means for rotating the input axis of the angular adjusting mechanism, detection means for detecting light transmitted through the polarizer 138, and control means for controlling the driving means on the basis of the output from the detection means. The control means controls the driving means so as to obtain a maximum output from the detection means. The driving means has also a function of fixing the movable frame 212 to the fixed frame 214 after the control. The driving means includes, for example, a stepping motor, which has a rotation shaft connected directly or indirectly through a member such as rubber or belt to the input axis of the angular adjusting mechanism.

The detection means mentioned above for detecting light transmitted through the polarizer 138 comprises, for example, a light receiving element inserted on the optical path between the polarizer 138 and the analyzer 140. Alternatively, the detection means may comprise a deflection element such as mirror inserted on the optical path between the polarizer 138 and the analyzer 140 and a light receiving element for receiving the light deflected by the mirror. Moreover, the detection means may be the light detector 150 with the polarizer 140 eliminated from the optical path.

Since the ellipsometer 100 of the present embodiment comprises the polarization angular adjusting mechanism 200, which can arbitrarily change the orientation or angle of the plane of the polarization of the beam incident upon the polarizer 138, the ellipsometer 100 can easily cause the plane of polarization of the plane-polarized light incident upon the polarizer to match with the transmission or optic axis of the polarizer. Therefore, it is possible to attain efficient utilization of light and efficiently improve accuracy in measurement.

The ellipsometer 100 according to this embodiment may be modified in various ways. Although the reference sample 114 may be exchangeable in the aforementioned embodiments, it may be non-exchangeable. In a preferable ellipsometer 100 employing non-exchangeable reference sample 114, the reference sample 114 is fixed at an appropriate position determined in advance. In this case, the height/inclination adjusting section 300 for the reference sample is not required. Therefore, the apparatus may be equipped with only the height/inclination adjusting section 400 for the objective sample.

Furthermore, the ellipsometer 100 may comprise a CCD camera unit for taking a picture of the reference sample 114 and the objective sample 124 from above, to adjust the positions of the reference sample 114 and the objective sample 124 in the horizontal direction (direction parallel to a plane containing the X-axis and Y-axis). Furthermore, to automatically adjust the positions in the horizontal direction, the ellipsometer 100 may have a mechanism for adjusting an XY stage based on the data obtained by the CCD camera unit.

The beam projecting portion 130 may project the light beam emitted from the light source 132 directly toward the reference sample 114 without passing through the optical fiber. In this case, the beam projecting portion 130 has a light source fixing portion in place of the optical fiber fixing portion.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. An ellipsometer for detecting polarization of light successively reflected from a reference sample and an objective sample to study a surface state of the objective sample, the ellipsometer, which has a first optical path and a second optical path, comprising:

a first sample holder unit for holding a first sample;
a second sample holder unit for holding a second sample;

a beam projecting portion for projecting a beam of plane-polarized light toward the first sample;

a polarizer for allowing light having a specific plane of polarization to transmit therethrough;

a turn-around prism for turning around the light beam reflected from the first sample in parallel at a distance to direct it to the second sample;

an analyzer for allowing light having a specific plane of polarization to transmit therethrough;

a light detector for detecting light transmitted through the analyzer; and a sample positioning mechanism for arranging the first and second samples at appropriate positions and in appropriate orientations, the first optical path extending from the beam projecting portion to the turn-around prism by way of the first sample, the second optical path extending from the turn-around prism to the light detector by way of the second sample, the first and second optical paths extending in parallel at an interval between them and communicated with each other through the turn-around prism;

the polarizer located on the first optical path between the beam projecting portion and the first sample, the analyzer located on the second optical path between the second sample and the light detector, the polarizer allowing plane-polarized light having a plane of polarization inclined at an angler of +45° with respect to a plane of incidence of the first sample to transmit therethrough, the polarizer and analyzer satisfying crossed Nicols;

one of the first and second samples being the objective sample, the other of the first and second samples being the reference sample to be compared to the objective sample in polarization analysis, accordingly, one of the first and second sample holder units being an objective sample holder unit, the other one of the first and second sample holder units being a reference sample holder unit; and the sample positioning mechanism including the objective sample holder unit, the objective sample holder unit holding the objective sample so as to adjust height and inclination thereof, and the sample positioning mechanism comprising an objective sample height/inclination adjusting section for adjusting the height and inclination of the objective sample.

2. The ellipsometer according to claim 1, wherein the objective sample holder unit comprises a sample holder on which the objective sample is fixed, a first goniostage for inclining the sample holder about a first axis, a second goniostage for inclining the sample holder together with the first goniostage about a second axis, and a height adjusting stage for displacing the sample holder together with the first and second goniostages along a third axis.

3. The ellipsometer according to claim 2, wherein the objective sample height/inclination adjusting section comprises a height-measuring optical unit, an inclination-measuring optical unit, and a processing section for processing data obtained from each of the height-measuring optical unit and the inclination-measuring optical unit; the height-measuring optical unit comprising a mirror for deflecting the light beam as needed, a rotary for moving the mirror between a position crossing the optical path and a position off the optical path, and a camera for taking a picture of the deflected light beam from the mirror; and the inclination-measuring optical unit comprising a mirror for deflecting the light beam as needed, a rotary for moving the mirror between a position crossing the optical path and a position off the optical path, an objective lens for converging the deflected light beam from the mirror, and a camera for taking a picture of the converged light beam by the objective lens.

4. The ellipsometer according to claim 3, wherein the processing section has a monitor for displaying a spot of the light beam in the picture obtained by the camera of the height-measuring optical unit and displaying an image of a spot of the converged light beam in the picture obtained by the camera of the inclination-measuring optical unit.

5. The ellipsometer according to claim 3, wherein the processing section comprises arithmetic calculation means for obtaining height/inclination data of the objective sample, driving means for rotating an input axis of the first goniostage, an input axis of the second goniostage, and an input axis of the height adjusting stage, and control means for controlling the driving means on the bases of the height/inclination data.

6. The ellipsometer according to claim 5, wherein the arithmetic calculation means obtains height data by converting an image of a spot of the beam in the picture obtained by the camera of the height-measuring optical unit into binary form to obtain a center of gravity of the image of the spot, and obtains inclination data on the basis of a position of an image of the spot of the converged beam in the picture obtained by the camera of the inclination-measuring optical unit.

7. The ellipsometer according to claim 1, wherein the sample positioning mechanism includes the reference sample holder unit, the reference sample holder unit holding the reference sample so as to adjust the height and inclination thereof, and the sample positioning mechanism comprises a reference sample height/inclination adjusting section for adjusting height/inclination of the reference sample.

8. The ellipsometer according to claim 7, wherein the reference sample holder unit comprises a sample holder on which the reference sample is fixed, a first goniostage for inclining the sample holder about a first axis, a second goniostage for inclining the sample holder together with the first goniostage about a second axis, and a height adjusting stage for displacing the sample holder together with the first and second goniostages along a third axis.

9. The ellipsometer according to claim 8, wherein the reference sample height/inclination adjusting section comprises a height-measuring optical unit, an inclination-measuring optical unit, and a processing section for processing data obtained from each of the height-measuring optical unit and the inclination-measuring optical unit; the height-measuring optical unit comprising a mirror for deflecting the light beam as needed, a rotary for moving the mirror between a position crossing the optical path and a position off the optical path, and a camera for taking a picture of the deflected light beam from the mirror; and the inclination-measuring optical unit comprising a mirror for deflecting the light beam as needed, a rotary for moving the mirror between a position crossing an optical path and a position off the optical path, an objective lens for converging the deflected light beam from the mirror, and a camera for taking a picture of the converged light beam by the objective lens.

10. The ellipsometer according to claim 9, wherein the processing section has a monitor for displaying a spot of the light beam in the picture obtained by the camera of the height-measuring optical unit and displaying an image of a spot of the converged light beam in the picture obtained by the camera of the inclination-measuring optical unit.

11. The ellipsometer according to claim 9, wherein the processing section comprises arithmetic calculation means for obtaining height and inclination data of the reference sample, driving means for rotating an input axis of the first goniostage, an input axis of the second goniostage, and an input axis of the height adjusting stage, and control means for controlling the driving means on the bases of the height and inclination data.

12. The ellipsometer according to claim 11, wherein the arithmetic calculation means obtains height data by converting an image of a spot of the light beam in the picture obtained by the camera of the height-measuring optical unit into binary form to obtain a center of gravity of the image of the spot, and obtains inclination data on the basis of a position of an image of the spot of the converged light beam in the picture obtained by the camera of the inclination-measuring optical unit.

13. The ellipsometer according to claim 11, further comprising a polarization angular adjusting mechanism, arranged between the beam projecting portion and the polarizer, for adjusting angular direction of the polarization of plane-polarized light about an optical axis projected from the beam projecting portion, the polarization angular adjusting mechanism comprising a plane-polarization rotatory element for rotating the polarization of incident plane-polarized light about the optical axis, and a mount for rotatably supporting the plane-polarization rotatory element about the optical axis.

14. The ellipsometer according to claim 13, wherein the plane polarization rotatory element comprises a half-wave plate.

15. The ellipsometer according to claim 14, wherein the mount rotates the half-wave plate so that an angular direction of an optic axis of the half-wave plate is varied within a range of 0° to 180° with respect to the polarization of the incident plane-polarized light.

16. The ellipsometer according to claim 13, wherein the mount comprises a movable frame for holding the plane-polarization rotatory element, and a fixed frame for rotatably supporting the movable frame about an axis identical to the optical axis.

17. The ellipsometer according to claim 16, wherein the fixed frame comprises an angular adjusting mechanism for adjusting an angle of the movable frame about the axis, the angular adjusting mechanism having a rotatable input axis with a rotation supplied thereto converted into an angular change of the movable frame.

18. The ellipsometer according to claim 17, further comprising a control section for controlling an angular adjusting mechanism, the control section comprising driving means for rotating the input axis of the angular adjusting mechanism, detection means for detecting light transmitted through the polarizer, and control means for controlling the driving means based upon output from the detection means so as to obtain a maximum output from the detection means.

19. An ellipsometer for detecting polarization of light successively reflected from a reference sample and an objective sample to study a surface state of the objective sample, the ellipsometer, which has a first optical path and a second optical path, comprising:
a first sample holder unit for holding a first sample;
a second sample holder unit for holding a second sample;
a beam projecting portion for projecting a beam of plane-polarized light toward the first sample;
a polarizer for allowing light having a specific plane of polarization to transmit therethrough;
a turn-around prism for turning around a light beam reflected from the first sample to direct it to the second sample in parallel to the incident light beam at a distance therefrom;
an analyzer for allowing light having a specific plane of polarization to transmit therethrough;
a light detector for detecting light transmitted through the analyzer; and
a polarization angular adjusting mechanism, arranged between the beam projecting portion and the polarizer, for adjusting angular direction of the polarization of plane-polarized light about an optical axis projected from the beam projecting portion,
the first optical path extending from the beam projecting portion to the turn-around prism by way of the first sample, the second optical path extending from the turn-around prism to the light detector by way of the second sample, the first and second optical paths extending in parallel at an interval between them and communicated with each other through the turn-around prism;
the polarizer located on the first optical path between the beam projecting portion and the first sample, the analyzer located on the second optical path between the second sample and the light detector, the polarizer allowing plane-polarized light having a plane of polarization inclined at an angler of +45° with respect to a plane of incidence of the first sample to transmit therethrough, the polarizer and analyzer satisfying crossed Nicols;
one of the first and second samples being the objective sample, the other of the first and second samples being the reference sample to be compared to the objective sample in polarization analysis, accordingly, one of the first and second sample holder units being an objective sample holder unit, the other one of the first and second sample holder units being a reference sample holder unit; and
the polarization angular adjusting mechanism comprising a plane-polarization rotatory element for rotating the polarization of incident plane-polarized light about the optical axis, and a mount for rotatably supporting the plane-polarization rotatory element about the optical axis.

20. The ellipsometer according to claim 19, wherein the plane-polarization rotatory element comprises a half-wave plate.

21. The ellipsometer according to claim 20, wherein the mount rotates the half-wave plate so that an angular direction of an optic axis of the half-wave plate is varied within a range of 0° to 180° with respect to the polarization of the incident plane-polarized light.

22. The ellipsometer according to claim 19, wherein the mount comprises a movable frame for holding the plane polarization rotatory element, and a fixed frame for rotatably supporting the movable frame about an axis identical to the optical axis.

23. The ellipsometer according to claim 22, wherein the fixed frame comprises an angular adjusting mechanism for adjusting an angle of the movable frame about the axis, the angular adjusting mechanism having a rotatable input axis with a rotation supplied thereto converted into an angular change of the movable frame.

24. The ellipsometer according to claim 23, further comprising a control section for controlling the angular adjusting mechanism, the control section comprising driving means for rotating the input axis of the angular adjusting mechanism, detection means for detecting light transmitted through the polarizer, and control means for controlling the driving means based upon output from the detection means so as to obtain a maximum output from the detection means.

* * * * *